US012657752B2

(12) United States Patent
Li

(10) Patent No.: US 12,657,752 B2
(45) Date of Patent: Jun. 16, 2026

(54) METHOD FOR RECOGNIZING VARIOUS LINES IN PDF BY FUNCTION FITTING BASED ON DESKTOP SOFTWARE

(71) Applicant: Fujian Foxit Software Development Joint Stock Co., Ltd., Fuzhou (CN)

(72) Inventor: Wensheng Li, Fuzhou (CN)

(73) Assignee: Fujian Foxit Software Development Joint Stock Co., Ltd., Fuzhou (CN)

( * ) Notice: Subject to any disclaimer, the term of this patent is extended or adjusted under 35 U.S.C. 154(b) by 459 days.

(21) Appl. No.: 18/035,602

(22) PCT Filed: Mar. 30, 2022

(86) PCT No.: PCT/CN2022/000058
§ 371 (c)(1),
(2) Date: May 5, 2023

(87) PCT Pub. No.: WO2022/252613
PCT Pub. Date: Dec. 8, 2022

(65) Prior Publication Data
US 2024/0013417 A1     Jan. 11, 2024

(30) Foreign Application Priority Data

Jun. 1, 2021    (CN) .......................... 202110610430.5

(51) Int. Cl.
G06K 9/00     (2022.01)
G06T 7/12     (2017.01)
G06T 7/60     (2017.01)
(52) U.S. Cl.
CPC .................. G06T 7/60 (2013.01); G06T 7/12 (2017.01); G06T 2200/24 (2013.01)
(58) Field of Classification Search
CPC .............................. G06T 5/70; G06V 30/1456
See application file for complete search history.

(56) References Cited

U.S. PATENT DOCUMENTS

2019/0371008 A1* 12/2019 Peterson ............... G06T 11/203

FOREIGN PATENT DOCUMENTS

CN        104252715 A   * 12/2014
CN        113361368       9/2021

OTHER PUBLICATIONS

International Search Report (English and Chinese) and Written Opinion of PCT/CN2022/000058 dated Jun. 6, 2022, 11 pages.

* cited by examiner

*Primary Examiner* — Molly Wilburn
*Assistant Examiner* — Aidan Keup
(74) *Attorney, Agent, or Firm* — Rankin, Hill & Clark LLP

(57)            ABSTRACT

A method for identifying multiple types of lines in a PDF on the basis of desktop software by means of function fitting, the method being characterized in respect of comprising: step 1: opening a drawing file in a PDF format, and generating a line-fitted vector graph on the basis of an image of a plurality of monochrome lines comprised in an original file; step 2: comparing differences between a line of an original line image and lines of the fitted vector graph, and specifically calculating standard vertical distances between pixel points of the line of the original line image and a plurality of fitted vector graph lines; step 3: selecting from thereamong the fitted vector graph line having the smallest standard vertical distance as a final matching line; and step 4: determining whether the line of the original line image is a dashed line, and if the line is a dashed line, making perpendicular lines from all the pixel points of the original line image to a corresponding matching vector graph line geometric function, and storing the coordinates of feet of a perpendicular in an array.

11 Claims, 1 Drawing Sheet

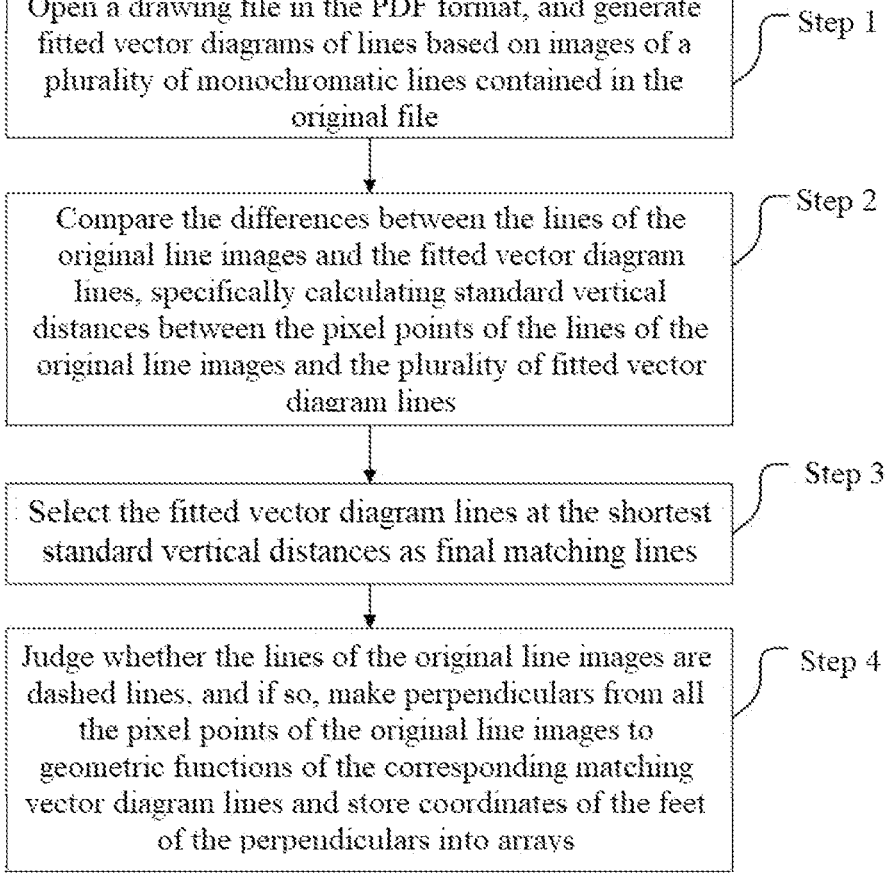

Open a drawing file in the PDF format, and generate fitted vector diagrams of lines based on images of a plurality of monochromatic lines contained in the original file — Step 1

Compare the differences between the lines of the original line images and the fitted vector diagram lines, specifically calculating standard vertical distances between the pixel points of the lines of the original line images and the plurality of fitted vector diagram lines — Step 2

Select the fitted vector diagram lines at the shortest standard vertical distances as final matching lines — Step 3

Judge whether the lines of the original line images are dashed lines, and if so, make perpendiculars from all the pixel points of the original line images to geometric functions of the corresponding matching vector diagram lines and store coordinates of the feet of the perpendiculars into arrays — Step 4

METHOD FOR RECOGNIZING VARIOUS LINES IN PDF BY FUNCTION FITTING BASED ON DESKTOP SOFTWARE

TECHNICAL FIELD

The present invention relates to the field of image processing, and in particular to a method for recognizing various lines in PDF by function fitting based on a desktop software.

BACKGROUND

In order to facilitate circulation, many engineering drawing software, such as CAD software, often export models drawn or designed with them into drawings in the PDF format, and exported contents are usually in the image format. However, when the PDF file containing these image format contents are zoomed in for viewing, various lines in the images will appear jagged, severely affecting the experience of a user in reading the drawings.

SUMMARY

In order to solve the aforementioned problem, the present invention provides a method for recognizing various lines in PDF by function fitting based on a desktop software, which can recognize known various basic lines in the image format, such as straight lines, rays, construction lines, polylines, rectangles, arcs, circles, rings, ellipses and elliptic arcs, as vector lines by a function fitting method, so that the lines can still be displayed smoothly when zoomed in for viewing, achieving the purpose of reducing the jagged display of the lines in the images.

In order to achieve the aforementioned objective, the present invention provides a method for recognizing various lines in PDF by function fitting based on a desktop software, which comprises the following steps:

Step 1: opening a drawing file in the PDF format, and generating fitted vector diagrams of lines based on images of a plurality of monochromatic lines contained in the original file;

Step 2: comparing the differences between the lines of the original line images and the fitted vector diagram lines, specifically calculating standard vertical distances between the pixel points of the lines of the original line images and the plurality of fitted vector diagram lines;

Step 3: selecting the fitted vector diagram lines at the shortest standard vertical distances as final matching lines;

Step 4: judging whether the lines of the original line images are dashed lines, and if so, making perpendiculars from all the pixel points of the original line images to geometric functions of the corresponding matching vector diagram lines and storing coordinates of the feet of the perpendiculars into arrays for line type recognition.

In an embodiment of the present invention, Step 1 specifically comprises:

Step 11: opening a drawing file in the PDF format through the desktop software;

Step 12: manually circling, by a user, a line image, and selecting a corresponding option from the desktop software according to the circled line type, wherein the line type can be a straight line, a single-arrow line, a construction line, a polyline, a rectangle, an arc, a circle, a ring, an ellipse, or an elliptic arc;

Step 13: after clicking, by the user, the start recognition option, constructing, by the desktop software, a geometric function of the corresponding line type by extracting a plurality of points of the selected line multiple times, and generating a fitted vector diagram;

Step 14: overlaying the generated vector diagram and the original line image on the same plane.

In an embodiment of the present invention, if the line in Step 12 is a straight line, the specific process of constructing the geometric function of the corresponding line type through the plurality of points and generating the fitted vector diagram in Step 13 is as follows:

Step 1301: calculating the coordinates of a midpoint of the straight line;

Step 1302: calculating a straight distance between each coordinate point on the line and the midpoint;

Step 1303: according to calculation results, selecting the two points at the longest straight distance from the midpoint and not on the same side of the midpoint as endpoints of the corresponding line;

Step 1304: constructing a vector line according to the two determined endpoints.

In an embodiment of the present invention, if the line in Step 12 is a single-arrow line or a construction line, the specific process of constructing the geometric function of the corresponding line type through the plurality of points and generating the fitted vector diagram in Step 13 is as follows:

Step 1311: preprocessing the line, removing the arrow to make it a straight line;

Step 1312: calculating coordinates of a midpoint of the straight line and a straight distance from each coordinate point on the line to the midpoint;

Step 1313: according to calculation results, selecting two points at the longest straight distance from the midpoint and not on the same side of the midpoint as endpoints of the corresponding line;

Step 1314: calculating an included angle between a straight line formed by each point on the original line and the nearest endpoint and a vector line, determining the point where the included angle greater than 10° as an arrow point, and the endpoint corresponding to the arrow point is marked as the endpoint where the arrow is located;

Step 1315: constructing a vector line according to the determined arrow point and endpoints.

In an embodiment of the present invention, if the line in Step 12 is a polyline or a rectangle, the specific process of constructing the geometric function of the corresponding line type through the plurality of points and generating the fitted vector diagram in Step 13 is as follows:

Step 1321: recognizing each line segment of the polyline or the rectangle first;

Step 1322: calculating coordinates of a midpoint of each line segment;

Step 1323: calculating a straight distance between each coordinate point on each line segment and the corresponding midpoint;

Step 1324: according to calculation results, selecting two points at the longest straight distance from the midpoint and not on the same side of the midpoint as endpoints of the corresponding line segment;

Step 1325: if the line is the polyline, constructing a polyline vector line according to the two endpoints of each line segment; or if the line is the rectangle, constructing a rectangle vector line according to the two endpoints of each line segment.

In an embodiment of the present invention, if the line in Step 12 is a circle, the specific process of constructing the geometric function of the corresponding line type through the plurality of points and generating the fitted vector diagram in Step 13 is as follows:

Step 1331: calculating coordinates of the center of the circle, specifically taking the point with a mean value of horizontal coordinates of all the points as a horizontal coordinate and a mean value of vertical coordinates of all the points as a vertical coordinate as a coordinate point of the center of the circle;

Step 1332: selecting any point on the line as a start point;

Step 1333: calculating a radius of the circle, and constructing a vector diagram according to the center of the circle and the radius.

In an embodiment of the present invention, if the line in Step 12 is an arc, the specific process of constructing the geometric function of the corresponding line type through the plurality of points and generating the fitted vector diagram in Step 13 is as follows:

Step 1341: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1342: calculating an angle of a connecting line between each point on the line and the center of gravity point, and determining a start angle and an end point angle;

Step 1343: constructing a vector diagram according to the center of gravity, the start angle, and the end point angle.

In an embodiment of the present invention, if the line in Step 12 is a ring, the specific process of constructing the geometric function of the corresponding line type through the plurality of points and generating the fitted vector diagrams in Step 13 is as follows:

Step 1351: calculating coordinates of the center of the circle, specifically taking the point with a mean value of horizontal coordinates of all the points as a horizontal coordinate and a mean value of vertical coordinates of all the points as a vertical coordinate as a coordinate point of the center of the circle;

Step 1352: calculating a distance between each coordinate point on the line and the center of the circle to give a first distance and a second distance;

Step 1353: selecting the circle corresponding to the longer one of the first distance and the second distance as the circular line of an outer ring and the circle corresponding to the shorter one of the first distance and the second distance as the circular line of an inner ring, and selecting any point on the circular lines of the outer ring and the inner ring as a start point respectively;

Step 1354: calculating a radius of the outer ring and a radius of the inner ring respectively, and constructing vector diagrams according to the center of the circle, the radius of the outer ring, and the radius of the inner ring.

In an embodiment of the present invention, if the line in Step 12 is an ellipse, the specific process of constructing the geometric function of the corresponding line type through the plurality of points and generating the fitted vector diagram in Step 13 is as follows:

Step 1361: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1362: selecting any five points on the line;

Step 1363: determining a fitting function of the ellipse according to the five selected points, and constructing a vector diagram according to the fitting function.

In an embodiment of the present invention, if the line in Step 12 is an elliptic arc, the specific process of constructing the geometric function of the corresponding line type through the plurality of points and generating the fitted vector diagram in Step 13 is as follows:

Step 1371: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1372: calculating an angle of a connecting line between each point on the line and the center of gravity point, and determining a start point, a start angle, and an end point angle;

Step 1373: selecting any four points on the line except the start point;

Step 1374: determining a fitting function of the ellipse according to the start point and the any four points selected, and constructing a vector diagram according to the fitting function, the start angle, and the end point angle.

In an embodiment of the present invention, the standard vertical distance described in Step 2 is specifically calculated by the following formula:

$$\text{Length}(std) = \frac{\sqrt{\sum_{n=1}^{N} l(i)^2}}{N}$$

where i is the points on the line, N is the number of the points on the line, and l(i) is the vertical distance between the ith point on the line and the fitted vector line, where the unit of the vertical distance is pixel.

Through the function fitting recognition method, the desktop software of the present invention displays, in the form of vector diagrams, lines of the image of a drawing in the PDF formate exported by CAD software which originally appear as jagged lines when zoomed in for display. Thus, compared with the prior art, the present invention increases the smoothness of the displayed lines of the image zoomed in, increasing the comfort of a user in viewing the image.

BRIEF DESCRIPTION OF THE DRAWINGS

In order to more clearly illustrate the technical solution in embodiments of the present invention or the prior art, the accompanying drawings which need to be used in the description of the embodiments or the prior art will be introduced briefly below. Apparently, the accompanying drawings described below are merely some embodiments of the present invention, and those of ordinary skill in the art can also obtain other accompanying drawings according to these drawings without making creative efforts.

FIG. 1 is a flowchart of a method according to an embodiment of the present invention.

DETAILED DESCRIPTION

The technical schemes in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skilled in the art without creative efforts shall fall within the protection scope of the present invention.

FIG. 1 is a flowchart of a method according to an embodiment of the present invention. The present invention provides a method for recognizing various lines in PDF by function fitting based on a desktop software, which includes the following steps:

Step 1: opening a drawing file in the PDF format, and generating fitted vector diagrams of lines based on images of a plurality of monochromatic lines (the colors of the lines may be black or any other colors) contained in the original file;

in the present embodiment, Step 1 specifically includes:

Step 11: opening a drawing file in the PDF format through the desktop software;

Step 12: manually circling, by a user, a line image, and selecting a corresponding option from the desktop software according to the circled line type, where the line type may be a straight line, a single-arrow line, a construction line (double-arrow line), a polyline (solid line type), a rectangle (solid line type), an arc, a circle, a ring, an ellipse, an elliptic arc, etc.;

Step 13: after clicking, by the user, the start recognition option, constructing, by the desktop software, a geometric function of the corresponding line type by extracting a plurality of points of the selected line multiple times, and generating a fitted vector diagram, where points selected from different types of lines are different;

Step 14: superposing the generated vector diagram and the original line image on the same plane.

In the present embodiment, if the line in Step 12 is a straight line, the specific process of constructing the geometric function of the corresponding line type through the plurality of points and generating the fitted vector diagram in Step 13 is as follows:

Step 1301: calculating the coordinates of a midpoint of the straight line;

Step 1302: calculating a straight distance between each coordinate point on the line and the midpoint;

Step 1303: according to calculation results, selecting the two points at the longest straight distance from the midpoint and not on the same side of the midpoint as endpoints of the corresponding line;

Step 1304: constructing a vector line according to the two determined endpoints.

In the present embodiment, if the line in Step 12 is a single-arrow line or a construction line (double arrows), the specific process of constructing the geometric function of the corresponding line type through the plurality of points and generating the fitted vector diagram in Step 13 is as follows:

Step 1311: preprocessing the line, removing the arrow to make it a straight line;

Step 1312: calculating coordinates of a midpoint of the straight line and a straight distance from each coordinate point on the line to the midpoint;

Step 1313: according to calculation results, selecting two points at the longest straight distance from the midpoint and not on the same side of the midpoint as endpoints of the corresponding line;

Step 1314: calculating an included angle between a straight line formed by each point on the original line and the nearest endpoint and a vector line, determining the point where the included angle greater than 10° as an arrow point, and the endpoint corresponding to the arrow point is marked as the endpoint where the arrow is located; where if there is a single arrow, there is one determined endpoint where the arrow is located; and if the line is a construction line (double arrows), there are two determined endpoints where the arrows are located;

Step 1315: constructing a vector line according to the determined arrow point and endpoints.

Wherein, for the straight line, the single-arrow line and the construction line (double arrows), during the extraction of multi-point constructed geometric functions, only two endpoints need to be extracted once.

In the present embodiment, if the line in Step 12 is a polyline (solid line type) or a rectangle (solid line type), the specific process of constructing the geometric function of the corresponding line type through the plurality of points and generating the fitted vector diagram in Step 13 is as follows:

Step 1321: recognizing each line segment of the polyline (solid line type) or the rectangle (solid line type) first;

Step 1322: calculating coordinates of a midpoint of each line segment;

Step 1323: calculating a straight distance between each coordinate point on each line segment and the corresponding midpoint;

Step 1324: according to calculation results, selecting two points at the longest straight distance from the midpoint and not on the same side of the midpoint as endpoints of the corresponding line segment;

Step 1325: if the line is the polyline (solid line type), constructing a polyline (a function for drawing a polyline vector line) vector line according to the two endpoints of each line segment; or if the line is the rectangle, constructing a rectangle vector line according to the two endpoints of each line segment.

If the line is the polyline, it is necessary to find two endpoints of the line in a graphic coordinate matrix of the line first in order to extract a plurality of points, for example by adopting an algorithm that only one side is adjacent to other points, and then, (A) one of the endpoints is selected as a start point of line segment 1 to be connected with all the other points, angles are calculated, the coordinate points with the same angle (e.g. one or more) and connected (i.e. not disconnected in the middle) with the endpoint are defined as line segment 1, and the point on line segment 1 which is farthest from the endpoint is then selected as an end point of line segment 1;

(B) the end point of line segment 1 is taken as a start point of a line segment 2, the coordinates of all the other points of line segment 1 are then removed from the graphic coordinate matrix to construct graphic coordinate matrix 2, and (A) is repeated to complete the extraction of an end point of line segment 2;

(C) (B) is repeated until the extraction of endpoints of all line segments is completed;

finally, an algorithm which is the same as that for the straight line is adopted for each line segment, and the geometric function is constructed according to the extracted points, so that the fitted vector diagram is generated.

The rectangle (solid line type) is a special case of the polyline, i.e. a four-segment line figure. If the line is the rectangle, a start point algorithm for extracting a plurality of points of the rectangle is as follows:

Any point is taken as a reference point to be connected with all other points, all angles are calculated, the points with the same angle (there are two if the reference point is a rectangular corner, and otherwise, there is one) are regarded as line segment 1, and two endpoints of line segment 1 are calculated;

one of the endpoints is taken as a start point of the rectangle and the other as an end point of the rectangle, and each line segment of the rectangle is processed adopting the same algorithm as that for determining each line segment of the polyline until all endpoints of all the line segments are extracted;

finally, an algorithm which is the same as that for the straight line is adopted for each line segment, and the geometric function is constructed according to the extracted points, so that the fitted vector diagram is generated.

In the present embodiment, if the line in Step 12 is a circle, the specific process of constructing the geometric function of the corresponding line type through the plurality of points and generating the fitted vector diagram in Step 13 is as follows:

Step 1331: calculating coordinates of the center of the circle, specifically taking the point with a mean value of horizontal coordinates of all the points as a horizontal coordinate and a mean value of vertical coordinates of all the points as a vertical coordinate as a coordinate point of the center of the circle;

Step 1332: selecting any point on the line as a start point;

Step 1333: calculating a radius of the circle, and constructing a vector diagram according to the center of the circle and the radius.

If the line is the circle, with a start point and the center of the circle as references, any three random angle-directed points are selected to carry out extraction three times in total, and the geometric function of the circle may be constructed with every two points as a group, so that the fitted vector diagram is generated. The construction of the geometric function of the circle is equivalent to the construction of a binary quadratic equation according to the coordinates of the center of the circle and any point on the circle.

In the present embodiment, if the line in Step 12 is an arc, the specific process of constructing the geometric function of the corresponding line type through the plurality of points and generating the fitted vector diagram in Step 13 is as follows:

Step 1341: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1342: calculating an angle of a connecting line between each point on the line and the center of gravity point, and determining a start angle and an end point angle;

Step 1343: constructing a vector diagram according to the center of gravity, the start angle, and the end point angle.

If the line is the arc, then for the continuous arc, calculate the angle between each point on the line and the center of gravity point, and the angle values are a continuous interval of two angle values (a start angle Angel (start) and an end point angle Angel (end)) between 0° and 360°. When a plurality of points are extracted, with the start angle and the center of gravity point as references, any random angle-directed point is extracted each time, three times in total, and the geometric function of the arc is constructed with three of the start point+the extracted points as a group, so that the fitted vector diagram is generated.

In the present embodiment, if the line in Step 12 is a ring, the specific process of constructing the geometric function of the corresponding line type through the plurality of points and generating the fitted vector diagrams in Step 13 is as follows:

Step 1351: calculating coordinates of the center of the circle, specifically taking the point with a mean value of horizontal coordinates of all the points as a horizontal coordinate and a mean value of vertical coordinates of all the points as a vertical coordinate as a coordinate point of the center of the circle;

Step 1352: calculating a distance between each coordinate point on the line and the center of the circle to give a first distance L1 and a second distance L2;

Step 1353: selecting the circle corresponding to the longer one of the first distance L1 and the second distance L2 as an outer circular line and the circle corresponding to the shorter one of the first distance L1 and the second distance L2 as an inner circular line, and selecting any point on the outer circular line and the inner circular line as a start point respectively; for example, if L1>L2, the circular line at the distance L1 being an outer ring, and the circular line at the distance L2 being an inner ring;

Step 1354: calculating a radius of the outer ring and a radius of the inner ring respectively, and constructing vector diagrams according to the center of the circle, the radius of the outer ring, and the radius of the inner ring.

If the line is the ring, it can be regarded as two circular lines, and the method of extracting a plurality of points from each circular line is the same as the method of extracting a plurality of points from a single circular line, except that during vector diagram construction, the vector diagrams of the two circles are constructed according to the different radii.

In the present embodiment, if the line in Step 12 is an ellipse, the specific process of constructing the geometric function of the corresponding line type through the plurality of points and generating the fitted vector diagram in Step 13 is as follows:

Step 1361: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1362: selecting any five points on the line;

Step 1363: determining a fitting function of the ellipse according to the five selected points, and constructing a vector diagram according to the fitting function.

If the line is the ellipse, after coordinates of the center of gravity are determined, any point on the line is selected as a start point; with the center of gravity point and the start point as references, any two random angle-directed points are selected each time for extraction, three times in total; and the geometric function of the ellipse is constructed with every five points as a group, so that the fitted vector diagram is generated. The construction of the geometric function of the ellipse is equivalent to the construction of a binary quadratic equation according to the coordinates of any five points on the ellipse.

In the present embodiment, if the line in Step 12 is an elliptic arc, the specific process of constructing the geometric function of the corresponding line type through the plurality of points and generating the fitted vector diagram in Step 13 is as follows:

Step 1371: calculating coordinates of the center of gravity, specifically taking the point with a mean value of horizontal coordinates of all the points as a horizontal coordinate and a mean value of vertical coordinates of all the points as a vertical coordinate as a coordinate point of the center of gravity;

Step 1372: calculating an angle of a connecting line between each point on the line and the center of gravity point, and determining a start point, a start angle, and an end point angle;

Step 1373: selecting any four points on the line except the start point;

Step 1374: determining a fitting function of the ellipse according to the start point and the any four points selected, and constructing a vector diagram according to the fitting function, the start angle, and the end point angle.

If the line is the elliptic arc, for the continuous elliptic arc, the angle value of the angle between each point on the line and the center of gravity point is a continuous interval of two angle values (a start angle Angel (start) and an end angle Angel (end)) between 0° and 360°; then, with the start angle (the start angle Angel(start)) and the center of gravity point as references, any two random angle-directed points are selected for extraction each time, three times in total; the geometric function of the ellipse is then constructed with every five of the start point+the extracted points as a group, so that the fitted vector diagram is generated.

Step 2: comparing the differences between the lines of the original line images and a plurality of fitted vector diagram lines, specifically calculating standard vertical distances between the pixel points of the lines of the original line images and the fitted vector diagram lines;

In the present embodiment, the standard vertical distance described in Step 2 is specifically calculated by the following formula:

$$Length(std) = \frac{\sqrt{\sum_{n=1}^{N} l(i)^2}}{N}$$

where i is the points on the line, N is the number of the points on the line, and l(i) is the vertical distance between the ith point on the line and the fitted vector line, where the unit of the vertical distance is pixel.

Step 3: selecting the fitted vector diagram lines at the shortest standard vertical distances as final matching lines;

Step 4: judging whether the lines of the original line images are dashed lines, and if so, making perpendiculars from all the pixel points of the original line images to geometric functions of the corresponding matching vector diagram lines and storing coordinates of the feet of the perpendiculars into arrays for line type recognition.

Since the lines of the original line images are either solid lines or dashed lines in the image in the PDF format in the present embodiment, if the lines are dashed lines, that is, they are composed of a plurality of short lines, then if perpendiculars are made from all the pixel points of the original line images to the lines where the geometric functions of the corresponding matching vector diagram lines are located at this point, the coordinates of the feet of the perpendiculars of all the pixel points on the dashed lines corresponding to the vector diagram lines can be obtained, and these coordinates of the feet of the perpendiculars are stored into the arrays for subsequent line type recognition.

Through the function fitting recognition method, the desktop software of the present invention displays, in the form of vector diagrams, lines of the image of a drawing in the PDF formate exported by CAD software which originally appear as jagged lines when zoomed in for display. Thus, the present invention increases the smoothness of the displayed lines of the image zoomed in, increasing the comfort of a user in viewing the image.

It should be understood by those skilled in the art that the accompanying drawings are merely schematic diagrams of an embodiment, and the modules or processes in the accompanying drawings are not necessarily necessary for the implementation of the present invention.

Those skilled in the art should understand that the modules in the device in the embodiment may be distributed in the device in the embodiment according to the description of the embodiment, and may also be located in one or more devices different from this embodiment according to corresponding changes. The modules in the aforementioned embodiments may be combined into one module, or may be further divided into a plurality of sub-modules.

Finally, it should be noted that, the above embodiments are only used to illustrate the technical solutions of the present invention, but should not limit the same; although the present invention is described in detail with reference to the embodiments described above, it will be understood by those skilled in the art that, the technical solutions in the embodiments described above can still be modified, or some of the technical features can be equivalently replaced; and these modifications or replacements do not make the technical solutions corresponding thereto depart from the spirit and scope of the technical solution in the embodiments of the present invention.

What is claimed is:

1. A method for recognizing various lines in PDF by function fitting based on a desktop software executed by a computer processor, comprising the following steps:

Step 1: opening a drawing file in the PDF format, and generating fitted vector diagrams of lines based on images of a plurality of monochromatic lines contained in the original file;

Step 2: calculating standard vertical distances between the pixel points of the lines of the original line images and the plurality of fitted vector diagram lines;

Step 3: selecting the fitted vector diagram lines at the shortest standard vertical distances as final matching lines;

Step 4: judging whether the lines of the original line images are dashed lines, and when the lines of the original line images are determined to be dashed lines, making perpendiculars from all the pixel points of the original line images to geometric functions of the corresponding matching vector diagram lines and storing coordinates of the feet of the perpendiculars into arrays for line type recognition.

2. The method according to claim 1, wherein Step 1 comprises:

Step 11: opening a drawing file in the PDF format through the desktop software;

Step 12: manually circling, by a user, a line image, and selecting a corresponding option from the desktop software according to the circled line type, wherein the line type can be a straight line, a single-arrow line, a construction line, a polyline, a rectangle, an arc, a circle, a ring, an ellipse, or an elliptic arc;

Step 13: after clicking, by the user, the start recognition option, constructing, by the desktop software, a geometric function of the corresponding line type by extracting a plurality of points of the selected line multiple times, and generating a fitted vector diagram;

Step 14: overlaying the generated vector diagram and the original line image on the same plane.

3. The method according to claim 2, wherein the line in Step 12 is a straight line, the specific process of constructing the geometric function of the corresponding line type through the plurality of points and generating the fitted vector diagram in Step 13 is as follows:

Step 1301: calculating the coordinates of a midpoint of the straight line;

Step 1302: calculating a straight distance between each coordinate point on the line and the midpoint;

Step 1303: according to calculation results, selecting the two points at the longest straight distance from the midpoint and not on the same side of the midpoint as endpoints of the corresponding line;

Step 1304: constructing a vector line according to the two determined endpoints.

4. The method according to claim 2, wherein the line in Step 12 is a single-arrow line or a construction line, the specific process of constructing the geometric function of the corresponding line type through the plurality of points and generating the fitted vector diagram in Step 13 is as follows:

Step 1311: preprocessing the line, removing the arrow to make it a straight line;

Step 1312: calculating coordinates of a midpoint of the straight line and a straight distance from each coordinate point on the line to the midpoint;

Step 1313: according to calculation results, selecting two points at the longest straight distance from the midpoint and not on the same side of the midpoint as endpoints of the corresponding line;

Step 1314: calculating an included angle between a straight line formed by each point on the original line and the nearest endpoint and a vector line, determining the point where the included angle greater than 10° as an arrow point, and the endpoint corresponding to the arrow point is marked as the endpoint where the arrow is located;

Step 1315: constructing a vector line according to the determined arrow point and two endpoints.

5. The method according to claim 2, wherein the line in Step 12 is a polyline or a rectangle, the specific process of constructing the geometric function of the corresponding line type through the plurality of points and generating the fitted vector diagram in Step 13 is as follows:

Step 1321: recognizing each line segment of the polyline or the rectangle first;

Step 1322: calculating coordinates of a midpoint of each line segment;

Step 1323: calculating a straight distance between each coordinate point on each line segment and the corresponding midpoint;

Step 1324: according to calculation results, selecting two points at the longest straight distance from the midpoint and not on the same side of the midpoint as endpoints of the corresponding line segment;

Step 1325: the line is the polyline, constructing a polyline vector line according to the two endpoints of each line segment; or the line is the rectangle, constructing a rectangle vector line according to the two endpoints of each line segment.

6. The method according to claim 2, wherein the line in Step 12 is a circle, the specific process of constructing the geometric function of the corresponding line type through the plurality of points and generating the fitted vector diagram in Step 13 is as follows:

Step 1331: taking the point with a mean value of horizontal coordinates of all the points as a horizontal coordinate and a mean value of vertical coordinates of all the points as a vertical coordinate as a coordinate point of the center of the circle;

Step 1332: selecting any point on the line as a start point;

Step 1333: calculating a radius of the circle, and constructing a vector diagram according to the center of the circle and the radius.

7. The method according to claim 2, wherein the line in Step 12 is an arc, the specific process of constructing the geometric function of the corresponding line type through the plurality of points and generating the fitted vector diagram in Step 13 is as follows:

Step 1341: taking the point with a mean value of horizontal coordinates of all the points as a horizontal coordinate and a mean value of vertical coordinates of all the points as a vertical coordinate as a coordinate point of the center of gravity;

Step 1342: calculating an angle of a connecting line between each point on the line and the center of gravity point, and determining a start angle and an end point angle;

Step 1343: constructing a vector diagram according to the center of gravity, the start angle, and the end point angle.

8. The method according to claim 2, wherein the line in Step 12 is a ring, the specific process of constructing the geometric function of the corresponding line type through the plurality of points and generating the fitted vector diagram in Step 13 is as follows:

Step 1351: taking the point with a mean value of horizontal coordinates of all the points as a horizontal coordinate and a mean value of vertical coordinates of all the points as a vertical coordinate as a coordinate point of the center of the circle;

Step 1352: calculating a distance between each coordinate point on the line and the center of the circle to give a first distance and a second distance;

Step 1353: selecting the circle corresponding to the longer one of the first distance and the second distance as an outer circular line and the circle corresponding to the shorter one of the first distance and the second distance as an inner circular line, and selecting any point on the outer circular line and the inner circular line as a start point respectively;

Step 1354: calculating a radius of the outer ring and a radius of the inner ring respectively, and constructing vector diagrams according to the center of the circle, the radius of the outer ring, and the radius of the inner ring.

9. The method according to claim 2, wherein the line in Step 12 is an ellipse, the specific process of constructing the geometric function of the corresponding line type through the plurality of points and generating the fitted vector diagram in Step 13 is as follows:

Step 1361: taking the point with a mean value of horizontal coordinates of all the points as a horizontal coordinate and a mean value of vertical coordinates of all the points as a vertical coordinate as a coordinate point of the center of gravity;

Step 1362: selecting any five points on the line;

Step 1363: determining a fitting function of the ellipse according to the five selected points, and constructing a vector diagram according to the fitting function.

10. The method according to claim 2, wherein the line in Step 12 is an elliptic arc, the specific process of constructing the geometric function of the corresponding line type through the plurality of points and generating the fitted vector diagram in Step 13 is as follows:

Step 1371: taking the point with a mean value of horizontal coordinates of all the points as a horizontal coordinate and a mean value of vertical coordinates of all the points as a vertical coordinate as a coordinate point of the center of gravity;

Step 1372: calculating an angle of a connecting line between each point on the line and the center of gravity point, and determining a start point, a start angle, and an end point angle;

Step 1373: selecting any four points on the line except the start point;

Step 1374: determining a fitting function of the ellipse according to the start point and the any four points selected, and constructing a vector diagram according to the fitting function, the start angle, and the end point angle.

11. The method of claim 1, wherein the standard vertical distance described in Step 2 is calculated by the following formula:

$$\text{Length}(std) = \frac{\sqrt{\sum_{n=1}^{N} l(i)^2}}{N}$$

where i is the points on the line, N is the number of the points on the line, and l(i) is the vertical distance between the ith point on the line and the fitted vector line, where the unit of the vertical distance is pixel.

\* \* \* \* \*